United States Patent [19]

Lenz

[11] Patent Number: 4,555,853
[45] Date of Patent: Dec. 3, 1985

[54] DRIVE FOR POSITION CONTROLLED LINEARLY MOVABLE CARRIAGE

[75] Inventor: John O. Lenz, Coon Rapids, Minn.

[73] Assignee: Kurt Manufacturing Company, Inc., Minneapolis, Minn.

[21] Appl. No.: 575,033

[22] Filed: Jan. 30, 1984

[51] Int. Cl.[4] .............................................. G01B 3/12
[52] U.S. Cl. .............................. 33/125 M; 33/141 B; 33/1 M
[58] Field of Search ..................... 33/141.5, 142, 1 M, 33/174 L, 174 TA, 141 R, 141 B, 125 M, 23 C, 18 R; 104/118, 119, 93

[56] References Cited

U.S. PATENT DOCUMENTS

| 883,798 | 4/1908 | Gregory | 33/23 C |
|---|---|---|---|
| 2,867,908 | 1/1959 | Murrah . | |
| 2,992,620 | 7/1961 | Cherkas . | |
| 3,318,005 | 5/1967 | Petersen . | |
| 3,410,320 | 11/1968 | Ginsburgh et al. | 33/174 L |
| 3,561,120 | 2/1971 | Culver . | |
| 3,567,950 | 3/1971 | Meyer | 33/1 M |
| 3,636,635 | 1/1972 | Lemelson | 33/174 L |
| 3,675,583 | 7/1972 | Sobey et al. . | |
| 3,688,410 | 9/1972 | Zeidler et al. . | |
| 3,972,124 | 8/1976 | Mikolajczyk . | |

4,280,289 7/1981 Bassompierre .

FOREIGN PATENT DOCUMENTS 0150951 11/1980 Japan ............................. 33/125 R Primary Examiner—Harry N. Haroian
Attorney, Agent, or Firm—Kinney & Lange

[57] ABSTRACT

A carriage drive apparatus positions a carriage along a guide rail. First and second front drive rollers are rotatably mounted on a carriage drive housing on opposite sides of a nonrotating guide rail. The first and second front drive rollers are adapted to frictionally engage the guide rail. Third and fourth rear drive rollers are also mounted on the carriage drive housing on opposite sides of the guide rail. The third and fourth rear drive rollers are adapted to frictionally engage the guide rail. A motor is mounted on the carriage drive housing and is coupled to the front and rear drive rollers. The motor is used to drive the carriage drive housing along the guide rail. A sensor is used to sense the position of the carriage housing along the guide rail. The drive can be disengaged from the drive rail while the sensor remains engaged to permit teaching the controls various stop positions while manually moving the carriage drive housing.

13 Claims, 5 Drawing Figures

DRIVE FOR POSITION CONTROLLED LINEARLY MOVABLE CARRIAGE

BACKGROUND OF THE INVENTION

1. Field of the Invention

The present invention relates to a position sensing, manually teachable power drive for a linearly movable carriage which permits the carriage to be rapidly positioned at desired locations along its support ways or rails under programmed control.

2. Description of the Prior Art

A common technique for positioning industrial tools is to mount them to a carriage. The carriage is then driven along guide rails or ways by a ball nut and ball screw. The ball screw is a threaded shaft having a length equal to the distance the carriage must be moved and is rotatably driven by a motor. The carriage is attached to the nut and is moved along the guide rail as the shaft is rotated. Other devices have used rack and pinion drives which require a separate long rack gear.

Precise control and positioning is possible with the ball screw technique. If the ball screw is rotated too fast, however, the shaft will whip and vibrate. This, therefore, places an upper limit on the speed with which the carriage housing may be moved from position to position. What is desired therefore is a position sensing means to quickly and precisely move a carriage housing along its guide rails at speeds not limited by whipping of a ball screw shaft. This power drive unit must have readily releasable driving wheels so that the carriage can be manually moved back and forth along its guide rails for manual teaching. The position sensing element continues functioning when the driving wheels are released.

The present invention solves prior problems by eliminating the ball screw or separate rack gear. The carriage housing is driven along its guide rails by an attached power drive unit which uses friction drive rollers engaged with one of the carriage guide rails. No separate drive shaft is necessary.

U.S. Pat. No. 4,280,289 shows an underwater trenching machine which is driven along a pipe line by rollers mounted directly on the pipe. Although this structure does show the use of rollers for driving a machine along a cylindrical member, its application is significantly different from that of a carriage for moving a tool assembly.

U.S. Pat. No. 2,992,620 shows a carriage used to support measuring equipment attached to and moving along a track. The carriage includes rollers which move along the track but these rollers are not driven.

U.S. Pat. No. 3,675,583 describes a vehicle which moves about a vertical rail. Two driven wheels are engaged to opposite sides of the vertical rail and provide traction by which the vehicle may be driven.

U.S. Pat. No. 3,688,410 discloses an apparatus for measuring and displaying the amount of movement of a machine tool element. As a cylindrical rod moves a roller urged against the rod will rotate and sense the displacement of the rod.

The technique of measuring lengths in which a rotating element is urged against the item to be measured is also shown in U.S. Pat. Nos. 2,867,908, 3,318,005, 3,561,120, and 3,972,124.

There is a continuing need for improvement in tool carriage drives. The carriages must be capable of quick response and precise positioning. The carriage should also be easily interfaced to a computerized control system and manual teaching capability is very desirable.

SUMMARY OF THE INVENTION

The carriage drive of the present invention is independently driven along one of the guide rails for the carriage under programmed control. The carriage is capable of being moved rapidly from one position to another along the guide rail. The exact position of the carriage along the guide rails is also known in that the carriage drive has a readout encoder thereon.

The carriage drive includes a carriage drive housing which is connected to the carriage itself having two sets of drive rollers mounted thereon. First and second front drive rollers are mounted on opposite sides of one guide rail and are adapted to frictionally engage the guide rail. Likewise, third and fourth rear drive roller means are mounted on opposite sides of the same guide rail and adapted to frictionally engage the guide rail. A drive motor is also mounted on the carriage drive housing. The motor is coupled to the front and rear drive rollers and drives the rollers as the rollers bear against the guide rail. The position of the carriage along the guide rail is continually sensed by a readout encoder sensor on the drive housing.

In a preferred embodiment of the present invention the carriage drive housing comprises first and second sections, one on each lateral side of the rail. The first (front) and third (rear) drive rollers are positioned on the first section and are spaced in longitudinal direction of the rail. The second front and fourth rear drive rollers are positioned on the second section and also are spaced in longitudinal direction of the drive rail or way on the opposite side of the rail from the first and third rollers. Adjustable bolt means extend transversely to the rail and may be adjusted to thereby urge the drive rollers against opposite sides of the one guide rail for a friction or traction drive.

A gear drive couples the motor to the front and rear drive rollers. The carriage position is sensed by an encoder wheel independently urged against the guide rail and rotating as the carriage is driven. The encoder wheel provides information regarding the position of the carriage drive housing and thus the carriage being driven.

DESCRIPTION OF PREFERRED EMBODIMENT

The present invention is used for controlling the position of a large carriage member along long rails or ways rapidly and precisely, without having to rotate a long drive shaft. Commonly, the drive is by a ball shaft with a ball nut connected to the carriage. The shaft rotates to move the nut and the travelling carriage along the guide rails. With an extremely long ball shaft (as is needed for many installations) there is substantial "whip" that occurs if the shaft is rotated rapidly. The whip limits the speed of operation of the carriage.

Figure 5:
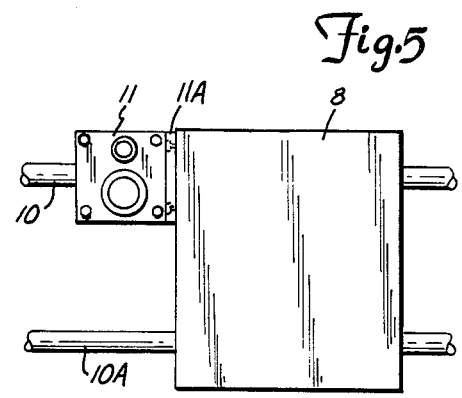
FIG. 5 is a schematic representation of a typical work carriage shown supported on guides with a drive of the present invention attached thereto.

The large carriage is shown in FIG. 5 at 8. The carriage is mounted on a pair of rails 10 and 10A that are parallel and elongated. None of the tools that might be used or carried by the carriage are shown. The carriage may carry tools such as, for example, carving tools in a carving machine under automatic control. The relative position of the carriage along the support rails or ways 10 and 10A has to be known, so an encoder that provides a digital output or other suitable signals as to its position with respect to a reference is also provided. In the present device the type of "teaching" has to take place so that when each of the positions are known, a signal can be provided to indicate that the desired position has been reached.

Referring to FIG. 5, the support rails or ways 10 and 10A are used in connection with a controlled device. A carriage drive housing indicated generally at 11 is connected to the carriage with cap screws extending through suitable ears or a flange 11A as shown.

Figure 1:
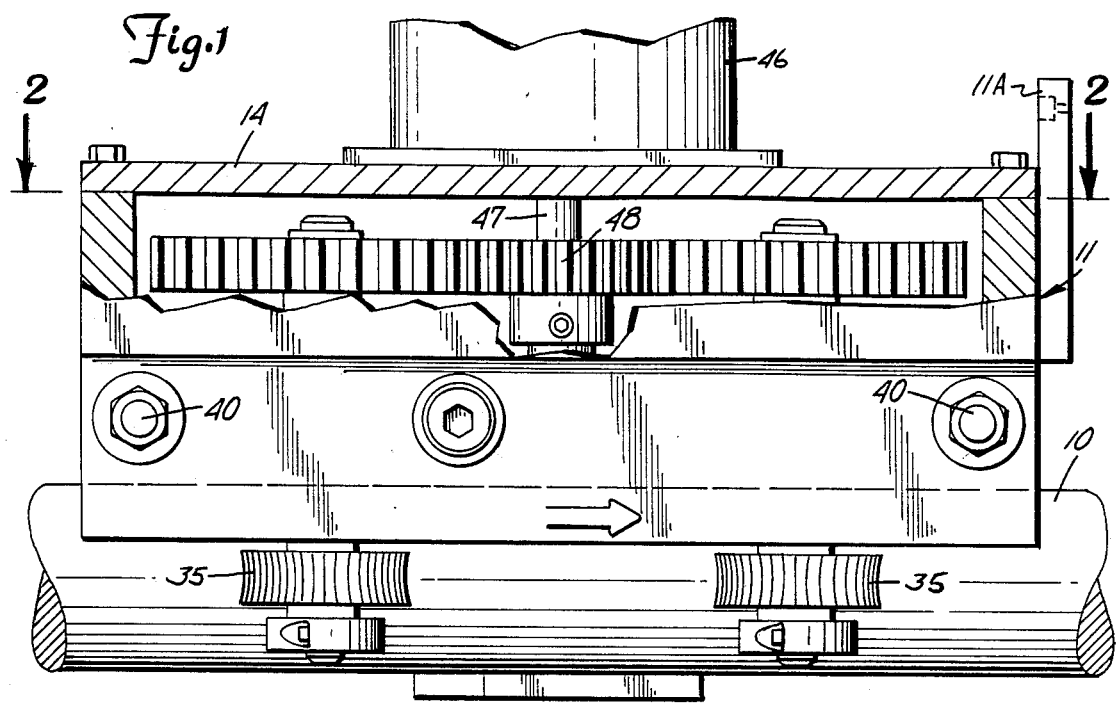
FIG. 1 is a side elevational view of an elongated shaft used for positioning mechanisms and having a drive housing made according to the present invention mounted thereon.

The carriage 8 is supported on rails called "round ways" in the form shown and has ball bushings for very low friction support on the rails or ways. The supports and ball bushings may be the type made and sold by Thompson Industries, Inc., Manhasset, N.Y., U.S.A. The carriage 8 will be moved along the rail 10 and 10A to move a particular tool carried by carriage 8 to some known position along the longitudinal axis of the rails 10 and 10A. As shown, the rails 10 and 10A are shafts having a circular cross-section and supported on a suitable support member 9 shown in FIGS. 3 and 4, but omitted in FIG. 1. The ball bushings used on carriage 8 are made to accommodate the support member 9.

The carriage drive housing 11 is mounted on the rail 10 and comprises a main body that has an upper recessed chamber 12, defined by a peripheral rim 13. This rim 13 as shown supports a cover plate 14. The chamber 12 is a gear chamber, and as shown the housing 11 has a central recess on its lower side indicated generally at 14. A deep slit 15 is made in the housing and forms two housing halves or sections, namely a first half 16 and a second half 17. The first and second housing halves are joined only through a relatively narrow web section 18 in the center. The slit 15 extends longitudinally along the entire length of the housing, or in other words in direction parallel to the longitudinal axis of the rails 10. The carriage drive housing 11 is mounted on the rail 10 and the rail 10A acts as a guide to stabilize the carriage.

Figure 2:
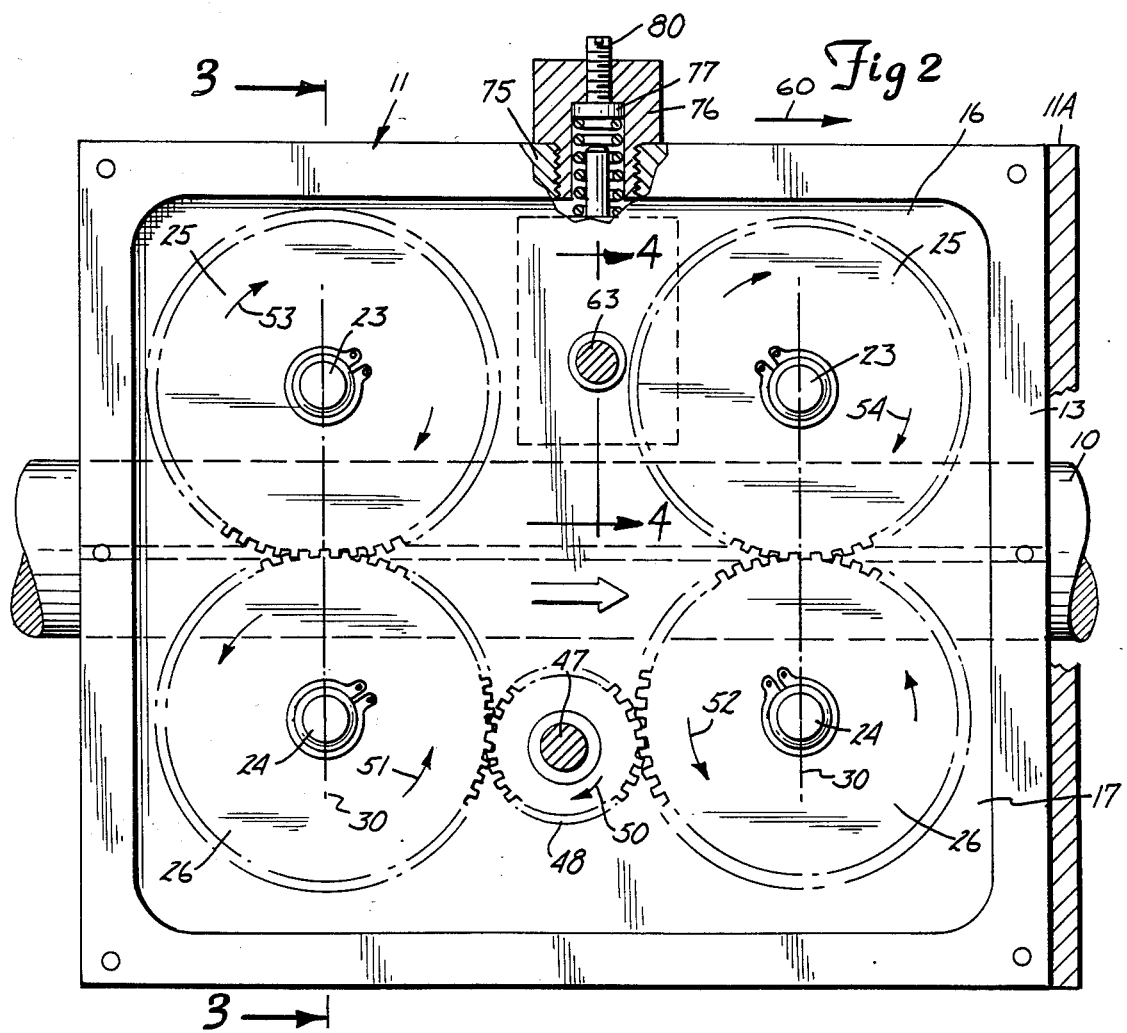
FIG. 2 is a plan view taken generally as on lines 2—2 in FIG. 1 with parts in section and parts broken away.
Figure 3:
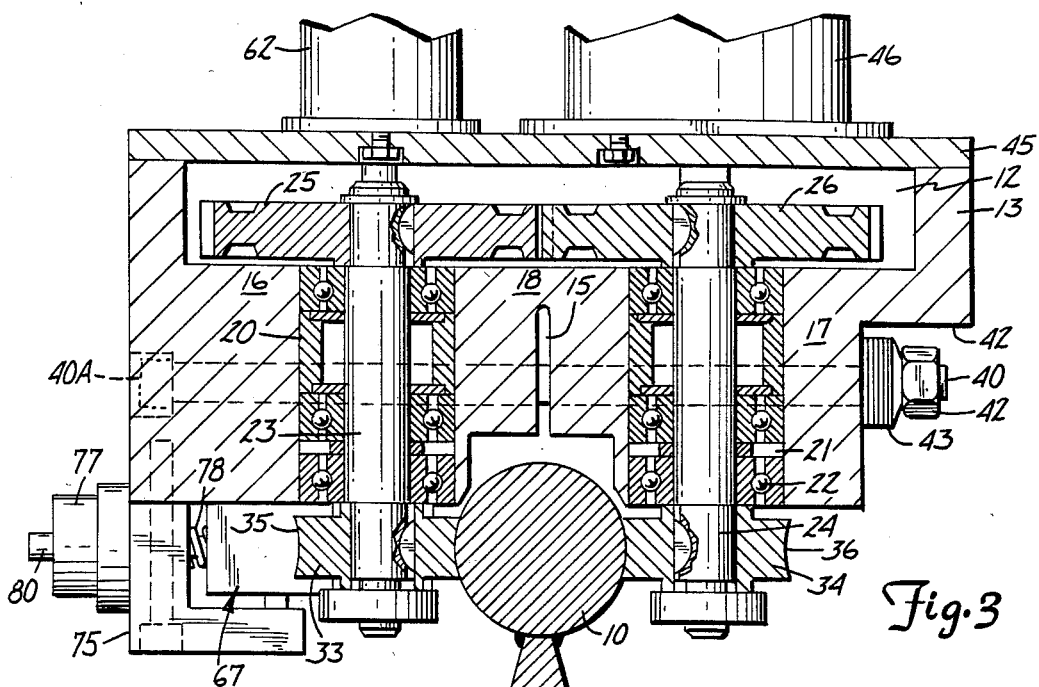
FIG. 3 is a sectional view taken as on line 3—3 in FIG. 2.

The drive housing 11 is provided with four mutually parallel bores indicated shown in FIG. 3. As shown, there are a pair of bores 20 on the housing half 16, and a pair of bores 21 on the housing half 17. The bores 20 are made to mount a plurality of suitable bearings shown at 22, in each of the bores. Each of these sets of bearings 22 mount individual shafts 23 in the housing half 16 and shafts 24 in the housing half 17. These are pairs of shafts that are both on the same side of the drive rail 10, as shown in FIG. 2.

Each of the shafts 23 and 24 in turn drivably mounts a spur gear. The spur gears are shown at 25 on the shafts 23 on housing half 16, and at 26 on the shafts 24 on housing half 17.

The bores 20 and 21 are spaced laterally apart so that each shaft 23 is disposed on an opposite side of drive rail 10 from a shaft 24 to form two sets of shafts, one front and one rear. A plane perpendicular to the axis of the drive rail 10, as shown by planes indicated at 30 in FIG. 2 passes through the axes of one shaft 23 and shaft 24 of each set of the oppositely disposed shafts.

The shafts 23 and 24 are spaced the same distance laterally from the axis or center of the drive rail 10, and the gears 25 and 26 are of size so that each of the gears 25 will mesh with one of the gears 26, and thus there will be a driving connection both at the front or leading and at the rear or trailing ends of the housing 11 between these gears. A pair of gears are on one lateral side of the rail 10, and a pair of gears are on the opposite lateral side of the rail 10, and one gear of each pair engages a corresponding gear of the other pair.

A plurality of friction drive rollers indicated at 33 and 34, respectively are drivably mounted on the lower ends of shafts 23 and 24. The friction drive rollers 33 and 34 have part cylindrical cross section, annular concave outer surfaces indicated at 35 and 36, respectively which are of configuration to engage and mate with the outer surfaces of the shaft or rail 10, as shown in FIG. 3. Thus there are two of the friction rollers 34, one on each of the shafts 24, and two of the friction rollers 33, one on each of the shafts 23. The rollers are arranged in oppositely disposed sets, so that each of the friction drive rollers of each pair of rollers is directly opposite from the other roller in the set. The sets of rollers frictionally engage the outer surfaces of the drive rail 10.

The force with which the concave surfaces 35 and 36 engage the shaft or rail 10 is determined by the clamping of the two housing halves 16 and 17 relative to each other. This clamp loading is accomplished with a pair of cross cap screws, indicated at 40. Cap screws 40 are positioned so that there is one adjacent each of the ends of the drive housing 10, and the cap screws 40 have heads 40A that fit into recesses on one side of the housing (on the housing half 16), and the other end of each cap screw is threaded and extends out from the lateral side of the housing half 17 as shown in FIG. 3. The housing half 17 has a shoulder or recess 42 defined therein so that the end of the cap screw 40 does not extend laterally out beyond the outer edge of the rim 13, as shown in FIG. 3.

A plurality of spring washers, commonly called Belleville springs, indicated generally at 43 are mounted on each of the cap screws 40, and a nut 42 is placed on the cap screw and tightened against the springs 43 to exert a spring force tending to compress the slit 15 by bending the web 18 and thereby forcing the oppositely facing rollers 33 and 34 against the sides of the drive rail 10.

A cover plate 45 is mounted to the rim 13 on the upper edge thereof to cover the gears that are in the recess in the housing. A drive motor 46 is mounted on the outside of cover plate 45. The motor has a drive shaft 47 and a spur drive gear 48 is drivably mounted on shaft 47 and is positioned between the gears 26 on the housing half 17, as shown in FIG. 2.

When the motor 47 is driven, and the gear 48 rotates in the direction as indicated by arrow 50, the gears 26 will also be rotated. The direction of rotation is indicated by the arrow 51 on the gear 26 to the left in FIG. 2, and by arrow 52 on the gear 26 to the right in FIG. 2. Because each of the gears 26 engages one of the pair of gears 25, the gears 25 will also be driven and the gear 25 to the left in FIG. 2 will be driven in the direction as indicated by the arrow 53. The gear 25 to the right in FIG. 2 will be driven as indicated by the arrow 54.

Thus all four shafts 23 and 24 are driven, and this means that all four of the rollers 33 and 34 are driven. The pair of rollers 33 on one side of the housing, shown in FIG. 2 will rotate in one direction and to move the carriage in the direction as indicated by the arrow 60 along the shaft or rail 10. The friction drive rollers 34 will also be rotating in a proper direction to tend to move the carriage drive housing 11, and thus carriage 8, in the same longitudinal direction along the rail 10 and rail 10A.

Figure 4:
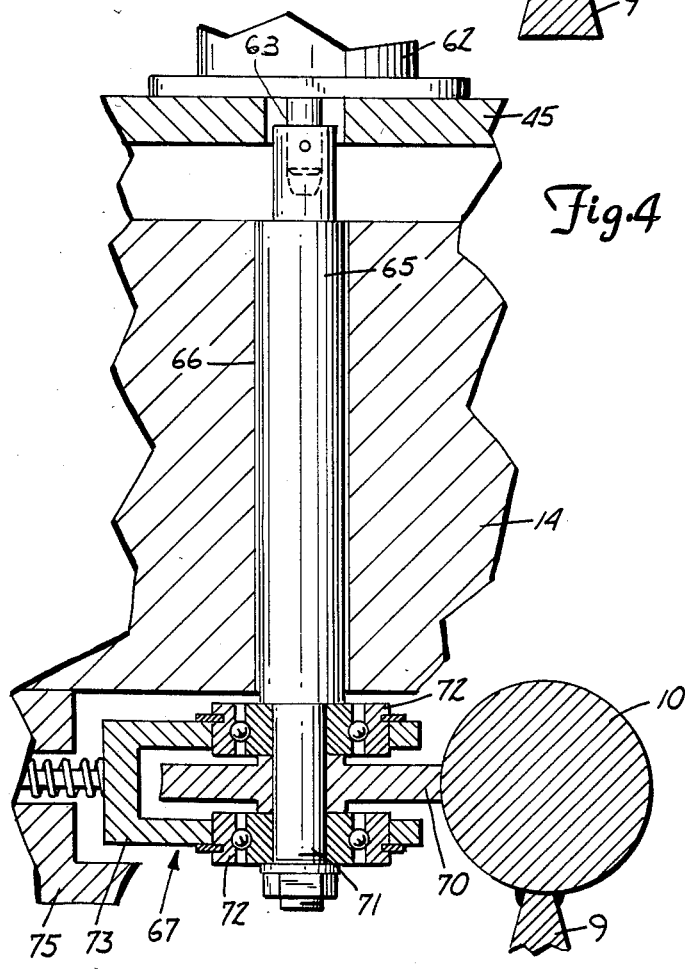
FIG. 4 is a fragmentary sectional view taken as on line 4—4 in FIG. 2.

In order to determine the position of the carriage drive housing 11 along the axis of the rail 10, a type of "encoder" must be also driven to indicate movement along the rail 10 as the carriage 8 moves. In order to accomplish the encoding, the encoder assembly shown in FIG. 4 is mounted on a bore in the drive housing 11, as shown in the housing half 16 in that the motor 46 is on the housing half 17. The encoder assembly includes a suitable digital encoder 62 of conventional design which is mounted onto the cover 45. An encoder shaft 63 is shown in section in FIG. 2. Shaft 63 is coupled with an encoder shaft 65 that extends through a passageway 66 in the carriage housing. Passageway 66 is larger than the shaft 65, so that the shaft 65 can be moved laterally relative to the housing slightly.

The lower end of the shaft 65 is mounted in a yoke assembly indicated generally at 67 at a position below the drive housing 11. Yoke assembly 67 is a yoke of suitable design which supports and guides the shaft 65. A friction drive wheel 70 is mounted onto an end portion 71 of the shaft 65. The end portion 71 is mounted in a suitable pair of bearings 72 that are connected to a yoke member 73, so that when the encoder friction drive wheel 70 turns, the shaft 65 will rotate relative to the yoke member 73.

A suitable support block indicated generally at 75 is fastened to the lower side of the carriage drive housing 11, and it has an adjustment housing 76 supported thereon. The housing 76 has an interior chamber 77 that mounts a spring 78, and an adjustment screw 80 is threaded into the housing 76 and has a suitable washer or like member that bears against the spring 78. The spring 78, in turn, is suitably located on the yoke member 73. As shown, a tang extends into the interior of spring 80 to guide the yoke, and will exert a force on the yoke member 73 proportional to the adjustment of the screw 80 to urge the yoke member 73 and the entire yoke assembly 67 including the bearings 72 in a direction toward the rail or shaft 10. This then will cause the friction drive wheel 70 to engage the rail 10 under a spring load, and as the carriage drive housing 11 moves along the rail 10 under power of the motor 46, the encoder wheel 70 will be rotated, thereby rotating the shaft 65 and driving the encoder 62 to deliver electrical signals that will indicate the amount of movement of the carriage drive housing along the rail 10.

By establishing a reference location in a known manner, the precise position of the carriage drive housing 11 along the length of rail 10 will be determined, and suitable controls to the motor 46 will insure that the position of the carriage 8, driven by drive housing 11 can be repeated, when a suitable signal has been indicated that the carriage is to stop at any particular position along the rail.

By running the motor rapidly, the carriage 8 will move, and the rail or shaft 10 does not have to rotate, so "whipping" of a shaft having long distances between its supports is not a problem.

By loosening the cap screws 40 so that the springs 43 are not engaging the housing sections, the drive wheels 33 and 34 can be disengaged from the rail 10 for "teaching" the control system. The encoder friction wheel remains engaged with the rail 10. The encoder would be zeroed or started at a reference position. The encoder would then operate as the carriage drive housing 11 and carriage 8 are moved along the rails by hand, driving the encoder as the unit moves. At each position where the carriage is to stop along the rails 10 and 10A a suitable signal is provided to the controls. The encoder would indicate how far along the rails the desired position was. Once the various positions for stopping of the carriage along the rails 10 and 10A have been "taught" to the controls, the cap screws 40 would again be tightened to exert a spring force by tending to clamp the slit 15 together and holding the friction drive wheels 33 and 34 against the opposite sides of the rail 10. The motor 46 would be controlled as before, driving the gear 48, and in turn driving the gears 25 and 26 to move the carriage drive housing and carriage under the control of the friction drive wheels 33 and 34 acting against the rail 10.

In this way, rapid movement is possible on elongated shafts or rails without having a long shaft that must rotate, as is necessary with a ball nut drive.

Although the present invention has been described with reference to preferred embodiments, workers skilled in the art will recognize that changes may be made in form and detail without departing from the spirit and scope of the invention.

What is claimed is:

1. A carriage drive apparatus for positioning a carriage along a guide rail having a longitudinal axis, the carriage drive apparatus comprising:
   a carriage drive housing;
   first and second drive roller means rotatably mounted on the carriage drive housing in position to engage opposite sides of a guide rail, the first and second drive roller means adapted for frictional engaging contact with such guide rail;
   said carriage drive housing comprising first and second sections, the first drive roller means being positioned on the first section and the second drive roller means being positioned on the second section, adjustable means for urging the first and second sections together and for thereby urging the first and second drive roller means against the opposite sides of a guide rail on which the carriage drive housing is mounted for frictional engaging contact with such guide rail;
   motor means coupled to the first and second drive roller means for driving the first and second drive roller means to move the housing along a guide rail on which the carriage drive housing is mounted; and
   means for sensing the position of the carriage drive housing along a guide rail.

2. The apparatus of claim 1 and gear drive means for coupling the motor means to the first and second drive roller means.

3. The apparatus of claim 2 wherein the means for sensing the position of the carriage drive housing includes an encoder wheel urged against the guide rail and rotating as the carriage drive housing is driven along the guide rail, the encoder wheel providing information regarding the position of the carriage drive housing.

4. A drive system for use in conjunction with a controlled carriage positioning system in which the carriage is driven along a guide rail, the drive system comprising:
   a carriage drive housing having a first and a second section, the first and second sections being defined by a slot in the carriage housing parallel to a guide rail on which the carriage drive housing is mounted;
   first and second front drive roller means, the first front drive roller means being mounted on the first section of the carriage drive housing and the second front drive roller means being mounted on the second section of the carriage drive housing on an opposite side of such guide rail from the first front drive roller means and wherein the first and second front drive roller means are mounted to frictionally engage such a guide rail;
   third and fourth rear drive roller means, the third rear drive roller means being mounted on the first section of the carriage drive housing and the fourth rear drive roller means being mounted on the second section of the carriage drive housing on an opposite side of the guide rail from the third rear drive roller means and wherein the third and fourth rear drive roller means are mounted to frictionally engage such a guide rail;
   means for compressing the first and second carriage drive housing sections together thereby forcing the front and rear drive rollers against such a guide rail to provide traction engaging contact;
   motor means mounted on the carriage drive housing and coupled to drive at least one of the roller means for driving the carriage drive housing along such a guide rail; and
   means for sensing the position of the carriage drive housing along such guide rail.

5. The drive system of claim 4 and including gear means for coupling the motor means to the front and rear drive roller means to drive all four drive roller means.

6. The drive system of claim 5 wherein the means for sensing the carriage drive housing position comprises an encoder wheel urged against such a guide rail and rotating as the carriage drive housing is driven along such a guide rail, the encoder wheel providing information indicative of the carriage drive housing position.

7. The drive system of claim 6 wherein the drive rollers have peripheral edge surfaces configured to fit a guide rail which is cylindrical in shape.

8. The drive system of claim 7 wherein the means for compressing the first and second carriage drive housing sections comprises a bolt passing through bores in the first and second carriage housing sections, a spring mounted on said bolt and bearing against one of the sections, and a nut on the bolt for selectively compressing the spring against the one carriage drive housing section.

9. The drive system of claim 5 wherein the means for compressing the carriage drive housings together comprises means releasable to disengage the drive roller means from a guide rail without disengaging the means for sensing the position of the carriage drive housing to permit manually moving the carriage drive housing along a guide rail for teaching movement.

10. A carriage drive apparatus for positioning a carriage along a guide rail having a longitudinal axis, the carriage drive apparatus comprising:
   a carriage drive housing having a first section and a second section mounted to be relatively movable with respect to each other with a space between the sections;
   first and second drive roller means rotatably mounted on the carriage drive housing in position to engage opposite sides of a guide rail, the first and second drive roller means adapted for frictional engaging contact with such guide rail;
   adjustable means comprising an adjustable length connector adjustable for moving the first and second sections relative to each other to change the space between the sections and for thereby simultaneously urging the first and second drive roller means against the opposite sides of a guide rail on which the carriage drive housing is mounted for frictional engaging contact of the first and second drive roller means;
   motor means coupled to the first and second drive roller means for driving the first and second drive roller means to move the housing along a guide rail on which the carriage drive housing is mounted; and
   means for sensing the position of the carriage drive housing along a guide rail.

11. The apparatus of claim 10 and gear drive means for coupling the motor means to the first and second drive roller means.

12. The apparatus of claim 10 wherein said adjustable length connector comprises a bolt, having spring means thereon to exert a spring load against one of the sections to urge the sections relative to each other under such spring load.

13. The apparatus as specified in claim 10 wherein the first of said drive roller means is mounted on a first section of the housing, and the second of said drive roller means is mounted on the second section of said housing, and said housing sections are moved together for urging the first and second drive roller means against the opposite sides of a guide rail on which the carriage drive housing is mounted.

* * * * *